US009612768B2

(12) United States Patent
Katiyar et al.

(10) Patent No.: US 9,612,768 B2
(45) Date of Patent: Apr. 4, 2017

(54) METHODS AND SYSTEMS FOR STORING DATA AT DIFFERENT STORAGE TIERS OF A STORAGE SYSTEM

(71) Applicant: NETAPP, INC., Sunnyvale, CA (US)

(72) Inventors: Manish Katiyar, Santa Clara, CA (US); Ravikanth Dronamraju, Pleasanton, CA (US); Sunitha Sunil Sankar, Cupertino, CA (US)

(73) Assignee: NETAPP, INC., Sunnyvale, CA (US)

( * ) Notice: Subject to any disclaimer, the term of this patent is extended or adjusted under 35 U.S.C. 154(b) by 6 days.

(21) Appl. No.: 14/806,986

(22) Filed: Jul. 23, 2015

(65) Prior Publication Data

US 2017/0024161 A1  Jan. 26, 2017

(51) Int. Cl.
*G06F 3/06* (2006.01)

(52) U.S. Cl.
CPC .......... *G06F 3/0647* (2013.01); *G06F 3/0604* (2013.01); *G06F 3/0646* (2013.01); *G06F 3/0688* (2013.01); *G06F 3/0689* (2013.01); *G06F 3/0649* (2013.01)

(58) Field of Classification Search
CPC ..... G06F 3/0646; G06F 3/0647; G06F 3/0649
USPC .......... 711/102, 103, 165, 202, 203
See application file for complete search history.

(56) References Cited

U.S. PATENT DOCUMENTS

| 8,903,830 | B2 | 12/2014 | Edwards |
| 9,344,235 | B1* | 5/2016 | Putra et al. .................... 711/202 |
| 2007/0168633 | A1* | 7/2007 | English et al. ............... 711/165 |
| 2008/0077762 | A1* | 3/2008 | Scott et al. .................... 711/170 |
| 2010/0281230 | A1* | 11/2010 | Rabii et al. ................... 711/165 |

OTHER PUBLICATIONS

Edwards et al.; "FlexVol: Flexible, Efficient File Volume Virtualization in WAFL": NetApp, Inc.; USENIX '08: 2008 USENIX Annual Technical Conference; pp. 129-142.

* cited by examiner

*Primary Examiner* — Than Nguyen
(74) *Attorney, Agent, or Firm* — Klein, O'Neill & Singh, LLP

(57) ABSTRACT

Methods and systems for a storage server are provided. One method includes storing data at a first storage tier by a processor executable storage operating system; tracking the data stored at the first storage tier for moving the data to a second storage tier; transferring the data from the first storage tier to the second storage tier; and updating a data structure that tracks a transfer block number of a block that stores the data, where the transfer block number is based on a virtual identifier, a generation count and an offset value of a storage chunk that is a portion of a physical volume block number address space.

20 Claims, 13 Drawing Sheets

METHODS AND SYSTEMS FOR STORING DATA AT DIFFERENT STORAGE TIERS OF A STORAGE SYSTEM

TECHNICAL FIELD

The present disclosure relates to storage systems and more particularly, to storing data at different storage tiers.

BACKGROUND

A storage system typically comprises one or more storage devices where information may be stored, and from which information may be obtained, as desired. The storage system typically executes a storage operating system that functionally organizes the storage system by, inter alia, invoking storage operations in support of a storage service implemented by the storage system. The storage system may be implemented in accordance with a variety of storage architectures including, but not limited to, a network-attached storage environment, a storage area network and a storage device directly attached to a user or host computer. Continuous efforts are being made to efficiently use storage devices at different tiers.

SUMMARY

In one aspect, a machine implemented method is provided. The method includes storing data at a first storage tier by a processor executable storage operating system; tracking the data stored at the first storage tier for moving the data to a second storage tier; transferring the data from the first storage tier to the second storage tier; and updating a data structure that tracks a transfer block number of a block that stores the data, where the transfer block number is based on a virtual identifier, a generation count and an offset value of a storage chunk that is a portion of a physical volume block number address space.

In another aspect, a non-transitory, machine readable storage medium having stored thereon instructions for performing a method is provided. The machine executable code which when executed by at least one machine, causes the machine to: store data at a first storage tier; track the data stored at the first storage tier for moving the data to a second storage tier; transfer the data from the first storage tier to the second storage tier; and update a data structure that tracks a transfer block number of a block that stores the data, where the transfer block number is based on a virtual identifier, a generation count and an offset value of a storage chunk that is a portion of a physical volume block number address space.

In yet another aspect, a system comprising a memory with machine readable medium with machine executable code having stored thereon instructions is provided. A processor module coupled to the memory is configured to execute the machine executable code to: store data at a first storage tier; track the data stored at the first storage tier for moving the data to a second storage tier; transfer the data from the first storage tier to the second storage tier; and update a data structure that tracks a transfer block number of a block that stores the data, where the transfer block number is based on a virtual identifier, a generation count and an offset value of a storage chunk that is a portion of a physical volume block number address space.

This brief summary has been provided so that the nature of this disclosure may be understood quickly. A more complete understanding of the disclosure can be obtained by reference to the following detailed description of the various aspects thereof in connection with the attached drawings.

BRIEF DESCRIPTION OF THE DRAWINGS

The foregoing features and other features will now be described with reference to the drawings of the various aspects. In the drawings, the same components have the same reference numerals. The illustrated aspects are intended to illustrate, but not to limit the present disclosure. The drawings include the following Figures.

DETAILED DESCRIPTION

To facilitate an understanding of the various aspects of the present disclosure, the general architecture and operation of a networked storage system will first be described. The specific architecture and operation of the various aspects will then be described with reference to the general architecture.

As used in this disclosure, the terms "component" "module", "system," and the like are intended to refer to a computer-related entity, either software, hardware, a combination of hardware and software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer readable media including, but not limited to, an ASIC (application specific integrated circuit), CD (compact disc), DVD (digital video disk), ROM (read only memory), hard disk, EEPROM (electrically erasable programmable read only memory), flash memory devices or any other device, in accordance with the claimed subject matter.

It is noteworthy that the term "file" as used throughout this specification includes a container, structured or unstructured data, an object or any other logical storage entity.

Methods and systems for a storage server are provided. One method includes storing data at a first storage tier by a processor executable storage operating system; tracking the data stored at the first storage tier for moving the data to a second storage tier; transferring the data from the first storage tier to the second storage tier; and updating a data structure that tracks a transfer block number of a block that stores the data, where the transfer block number is based on a virtual identifier, a generation count and an offset value of a storage chunk that is a portion of a physical volume block number address space.

Figure 1:
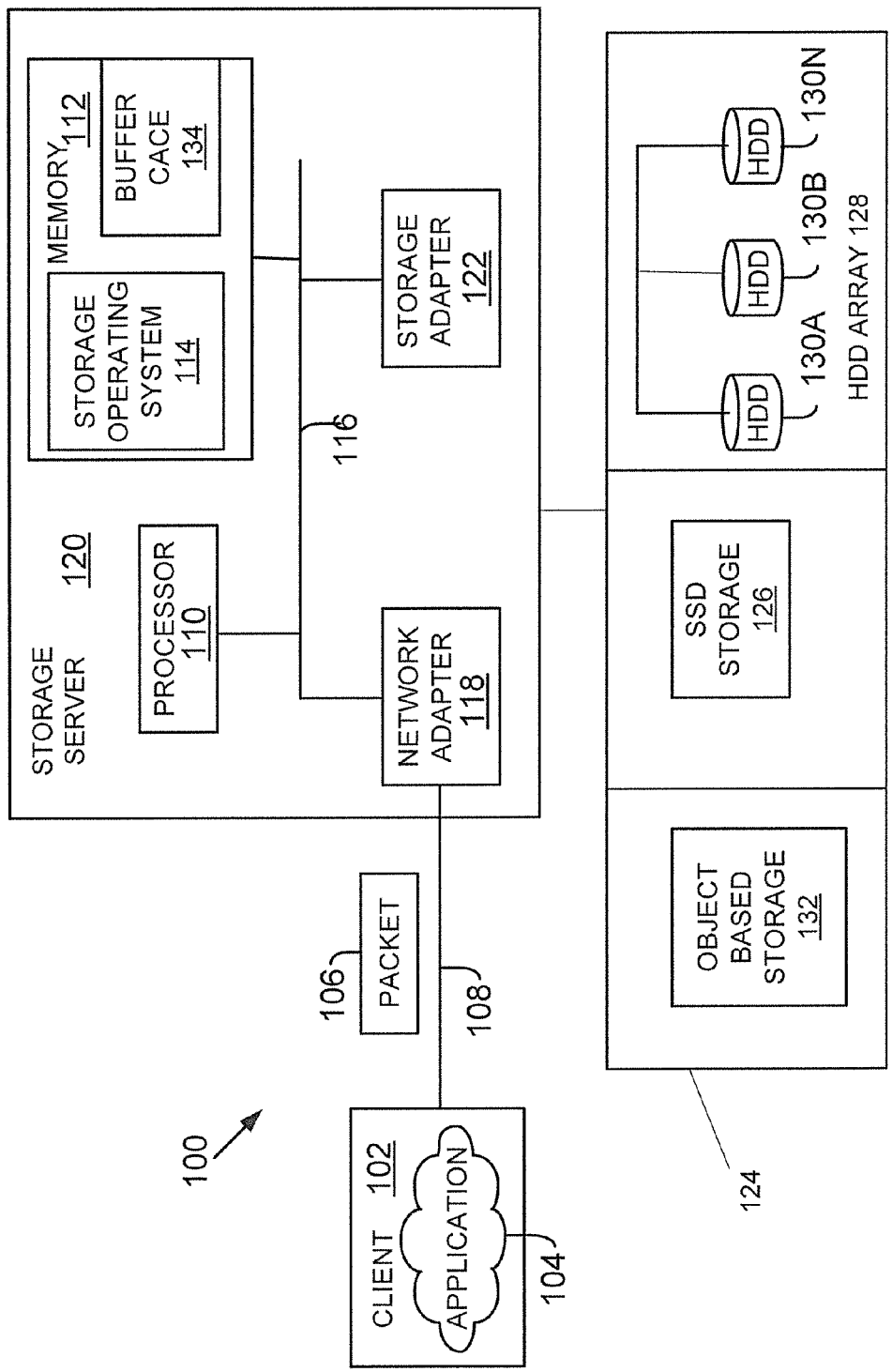
FIG. 1 shows a block diagram of a network system using the methodology of the present disclosure.

System:

FIG. 1 is a schematic block diagram of a system 100 including a networked storage apparatus that may be advantageously used with the various aspects disclosed herein. The network storage apparatus or a storage system (may also be referred to as storage server) 120 is a special-purpose computing device that provides various services relating to the organization of information at storage devices, for example, at a hybrid storage sub-system 124 that is described below in detail. However, it will be understood to those skilled in the art that the various aspects described herein may apply to any type of special-purpose (e.g., server) or general-purpose computer, including a standalone computer.

In one aspect, storage server 120 has access to a set of mass storage devices at a storage array 128 having a plurality of hard disk drives 130A-130N (referred to as 130 individually or collectively), a pool of solid state drives (SSDs) 126, or an apparatus 132 having storage for storing data based on unique object identifiers, rather than traditional file system paths. Thus the storage devices at the storage sub-system 124 may include any writable storage device media such as magnetic disks, video tape, optical, DVD, magnetic tape, non-volatile memory devices for example, SSDs including self-encrypting drives, flash memory devices and any other similar media adapted to store information. The storage devices may be organized as one or more groups of Redundant Array of Independent (or Inexpensive) Disks (RAID). The various aspects disclosed are not limited to any particular storage device type or storage device configuration.

In one aspect, storage sub-system 124 may be referred to as a hybrid aggregate because it at least includes SSDs and hard drives. The SSDs (referred to as performance tier storage) may be used as a read/write cache, especially for caching randomly accessed data because SSDs have better average latency compared to hard drives. In one aspect, data that is stored at SSDs but is not frequently accessed, may be referred to as "cold" data and is moved to HDDs 130 using the adaptive transfer volume block number (TVBN) space that is described below in more detail.

In one aspect, storage sub-system 124 is used for write staging, read caching and direct allocation of metafiles. The write operations staged at the SSD devices 126 provide better performance. The cold data is moved to HDD 130 or storage 132 (which may be cloud based) (jointly referred to as the capacity tier).

In one aspect, a read cached copy of a block or an initial write may be written at the SSD 126. The latter is classified as data that can be tiered to HDD 130 and may be referred to as write stage of "WS" data. As described below in details that WS data include TVBNs at indirect blocks that are also defined below. The blocks that are not tiered may be referred to as direct-allocated or "DA" blocks.

In one aspect, the SSD tier 126 may be used to absorb new write operations. When data becomes cold it is moved to a capacity tier. For read caching, after data is read from HDD 130, the data may be cached at an SSD based on a defined policy, as described below in detail.

In one aspect, physical storage space at storage devices of storage sub-system 124 is organized as one or more "aggregate", where each aggregate is a logical grouping of physical storage identified by a unique identifier and a location. The aggregate includes a certain amount of storage space that can be expanded. Within each aggregate, one or more storage volumes are created whose size can be varied. A qtree, sub-volume unit may also be created within the storage volumes.

In one aspect, the storage server 120 provides a set of logical storage volumes (may be interchangeably referred to as volume or storage volume) for providing physical storage space to clients. A storage volume is a logical storage object and typically includes a file system in a networked attached system (NAS) environment or a logical unit number (LUN) in a storage area network environment. The various aspects described herein are not limited to any specific format in which physical storage is presented as logical storage (volume, LUNs and others).

Each storage volume may be configured to store data files (or data containers), scripts, word processing documents, executable programs, and any other type of structured or unstructured data. From the perspective of one of the client systems, each storage volume can appear to be a single drive. However, each storage volume can represent storage space in at one storage device, an aggregate of some or all of the storage space in multiple storage devices, a RAID group, or any other suitable set of storage space.

In one aspect, storage server 120 comprises one or more of processor 110, a memory 112, a network adapter 118 and a storage adapter 122 interconnected by a bus 116. The bus system 116 is an abstraction that represents any one or more separate physical buses and/or point-to-point connections, connected by appropriate bridges, adapters and/or controllers. The bus 116, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor 110 may operate as a central processing unit (CPU) of the storage server 120 and, thus, control its overall operation. In certain aspects, processor accomplishes this by executing software stored in memory 112. A processor 110 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 112 represents any form of random access memory (RAM), read-only memory (ROM), flash memory, or the like, or a combination of such devices. Memory 112 includes the main memory of server 120. In the illustrative aspect, memory 112 may include storage locations that are addressable by processor 110 and adapters (118 and 122) for storing processor executable instructions and data structures associated with the various aspects of the present disclosure, as described below in detail. The processor 110 and adapters (118 and 122) may, in turn, comprise processing elements and/or logic circuitry configured to execute the instructions and manipulate the data structures. Portion of memory 112 may also be used as a buffer cache 134 that is described below in detail.

The storage server 120 also executes a storage operating system 114 that implements a file system to logically organize the information as a hierarchical structure of data containers (for example, directories, files, objects, structured and unstructured data).

The storage operating system 114, portions of which is typically resident in memory and executed by the processing elements, functionally organizes storage server 120 by, inter alia, invoking storage operations in support of a file service implemented by storage server 120. It will be apparent to those skilled in the art that other processing and memory means, including various computer readable media, may be used for storing and executing program instructions pertaining to the aspects described herein.

Network adapter 118 comprises mechanical, electrical and signaling circuitry needed to connect storage server 120 to a client 102 over a computer network 108, which may comprise a point-to-point connection or a shared medium, such as a local area network. The client 102 may be a general-purpose computer configured to execute applications including file system protocols, such as the Common Internet File System (CIFS), Networked File System (NFS) or any other protocol.

As briefly mentioned above, to facilitate access to storage space at the storage sub-system 124, the storage operating system 114 implements a file system that logically organizes the information as a hierarchical structure of directories and files on the disks. Each "on-disk" file may be implemented as set of disk blocks configured to store information, such as text, whereas a directory may be implemented as a specially formatted file in which other files and directories are stored. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a logical volume. The file system typically consists of a contiguous range of vbns from zero to n, for a file system of size n−1 blocks.

An example of storage operating system 114 is Data ONTAP™ storage operating system available from NetApp, Inc. that implements a Write Anywhere File Layout (WAFL) file system. Of course, the various aspects disclosed herein are not limited to any specific file system type and may be implemented by other file systems.

The storage operating system 114 may further implement a storage module, such as a RAID system, that manages the storage and retrieval of the information to and from storage devices in accordance with input/output (I/O) operations. The RAID system typically organizes the RAID groups into one large "physical" disk (i.e., a physical volume), such that the disk blocks are concatenated across all disks of all RAID groups. The logical volume maintained by the file system is then "disposed over" (spread over) the physical volume maintained by the RAID system.

When accessing a block of a file in response to servicing a client request, the file system specifies a vbn that is translated at the file system/RAID system boundary into a disk block number (dbn) location on a particular storage device (disk, dbn) within a RAID group of the physical volume. Each block in the vbn space and in the dbn space is typically fixed, e.g., 4 k bytes (kB), in size; accordingly, there is typically a one-to-one mapping between the information stored on the disks in the dbn space and the information organized by the file system in the vbn space. The (disk, dbn) location specified by the RAID system is further translated by a storage driver system of the storage operating system into a plurality of sectors (e.g., a 4 kB block with a RAID header translates to 8 or 9 disk sectors of 512 is or 520 bytes) on the specified storage device.

The requested block is then retrieved from the storage device and stored in the buffer cache 134 of the memory 112 as part of a buffer tree of the file. The buffer tree is an internal representation of blocks for a file stored in the buffer cache and maintained by the file system. Broadly stated and as described below in detail, the buffer tree has an inode at the root (top-level) of the file, as described below.

An inode is a data structure used to store information, such as metadata, about a file, whereas the data blocks are structures used to store the actual data for the file. The information in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Each pointer may be embodied as a vbn to facilitate efficiency among the file system and the RAID system when accessing the data on disks.

The client 102 may interact with the storage server 120 in accordance with a client/server model of information delivery. That is, the client may request the services of the storage server, and the storage server may return the results of the services requested by the client, by exchanging packets 106 encapsulating, e.g., the CIFS protocol format (or a block based format, e.g. the SCSI format) over the network 108. The block based SCSI format is also well known and is incorporated herein by reference in its entirety.

Operationally, the request from the client 102 is forwarded as the packet 106 over the computer network 108 and onto the storage system 120 where it is received at the network adapter 126. A network driver (of layer 208, FIG. 2) processes the packet and, if appropriate, passes it on to a network protocol layer (204, FIG. 2) and file access layer for additional processing prior to forwarding to a file system (202, FIG. 2). Here, the file system generates operations to load (retrieve) the requested data from storage sub-system 124 if it is not resident "in core", i.e., in the buffer cache 134.

If the information is not in the cache, the file system indexes into an inode file using an inode number to access an appropriate entry and retrieve a logical vbn. The file system then passes a message structure including the logical vbn to a RAID system; the logical vbn is mapped to a disk identifier and disk block number (disk,dbn) and sent to an appropriate driver (e.g., SCSI). The storage driver accesses the dbn from the specified storage device and loads the requested data block(s) in buffer cache 134 for processing by the storage system. Upon completion of the request, the storage system (and operating system) returns a reply to the client 102 over the network 108.

Storage adapter 122 cooperates with the storage operating system 114 to access information requested by a client application (104). The information may be stored at storage sub-system 124. The storage adapter includes input/output (I/O) interface circuitry that couples to storage sub-system 124 over an I/O interconnect arrangement, such as a conventional high-performance, Fibre Channel serial link topology or any other interconnect type. The information is retrieved by storage adapter 122 and, if necessary, processed by processor 110 (or the adapter 122 itself) prior to being forwarded over system bus 116 to network adapter 118, where the information is formatted into a packet and returned to client 102.

Although storage system 120 is shown as a stand-alone system, i.e. a non-cluster based system, in another aspect, storage system 120 may have a distributed architecture; for example, a cluster based system that may include a separate network module and a storage module (referred to as nodes). Briefly, the network module is used to communicate with client 102, while the storage module is used to communicate with the storage devices at storage sub-system 124. The network and storage modules may communicate with each other using an internal protocol.

Alternatively, storage system 120 may have an integrated architecture, where the network and storage modules are included within a single chassis. The storage system 120 further may be coupled through a switching fabric to other similar storage systems (not shown) which have their own local storage subsystems. In this way, all the storage subsystems can form a single storage pool, to which any client of any of the storage servers has access.

Figure 2:
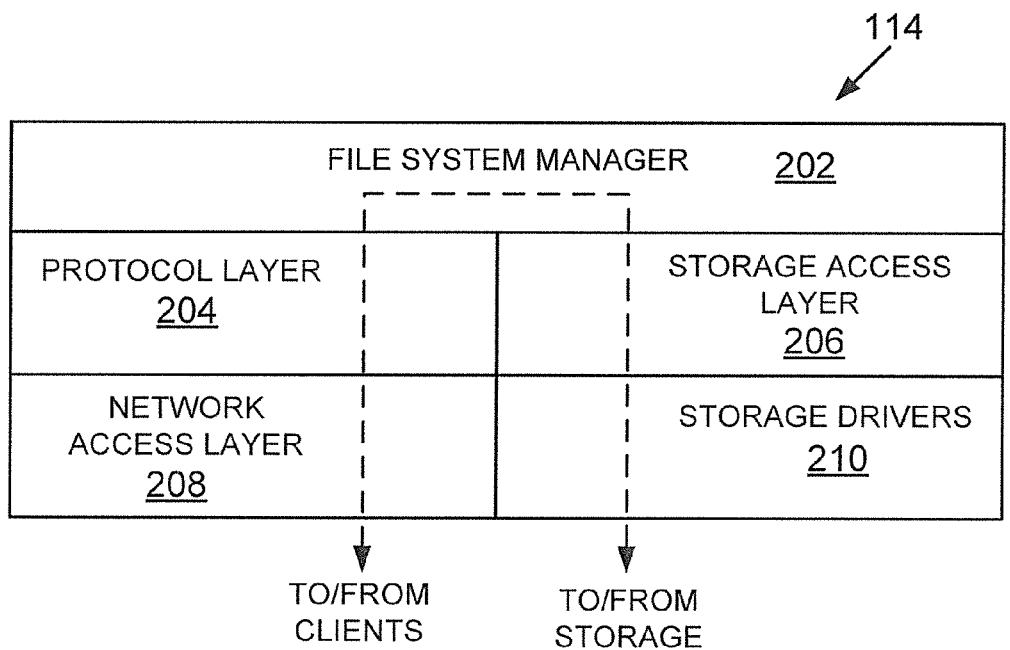
FIG. 2 shows an example of a storage operating system used by a storage server of FIG. 1.

Storage Operating System Architecture:

FIG. 2 illustrates a generic example of the storage operating system 114 for storage server 120, according to one aspect of the present disclosure. In one example, the storage operating system 114 may be installed on storage server 120 and executed out of memory by processor 110. It is noteworthy that storage operating system 114 may be used in any desired environment and incorporates any one or more of the features described herein.

In one example, storage operating system 114 may include several modules, or "layers." These layers include a file system manager 202 that keeps track of a directory structure (hierarchy) of the data stored in a storage subsystem and manages read/write operations, i.e. executes read/write operations in response to client 102 requests using the TVBN address space, as described below in more detail.

Storage operating system 114 may also include a protocol layer 204 and an associated network access layer 208, to allow storage server 120 to communicate over a network with other systems, such as clients 102. Protocol layer 204 may implement one or more of various higher-level network protocols, such as NFS, CIFS, Hypertext Transfer Protocol (HTTP), Transmission Control Protocol/Internet Protocol (TCP/IP) and others.

Network access layer 208 may include one or more drivers, which implement one or more lower-level protocols to communicate over the network, such as Ethernet or any other network type. Interactions between clients 102 and mass storage devices at storage sub-system 124 are illustrated schematically as a path, which illustrates the flow of data through storage operating system 114.

The storage operating system 114 may also include a storage access layer 206 (may also be referred to as a RAID layer) and an associated storage driver layer 210 to allow storage server 120 to communicate with the storage subsystem 124. The storage access layer 206 may implement a higher-level disk storage protocol, such as RAID (redundant array of inexpensive disks), while the storage driver layer 210 may implement a lower-level storage device access protocol, such as Fibre Channel Protocol (FCP) or SCSI. In one aspect, the storage access layer 206 may implement a RAID protocol, such as RAID-4 or RAID-DP™ (RAID double parity for data protection).

It should be noted that the software "path" through the storage operating system layers described above used to perform data storage access for the client request received at the storage server may alternatively be implemented in hardware. That is, in an alternate aspect of the invention, the storage access request data path may be implemented as logic circuitry embodied within a field programmable gate array (FPGA) or an application specific integrated circuit (ASIC). This type of hardware implementation increases the performance of the file service provided by storage server 120 in response to a file system request packet 106 issued by client 102. Moreover, in another alternate aspect of the invention, the processing elements of network and storage adapters (118, 122) may be configured to offload some or all of the packet processing and storage access operations, respectively, from processor 110 to thereby increase the performance of the file service provided by the storage server.

In one aspect, the file system 202 is illustratively a message-based system that provides logical volume management capabilities for use in access to the information stored at the storage devices. The file system 202 illustratively implements the WAFL file system having an on-disk format representation that is block-based using, e.g., 4 kilobyte (KB) blocks and using inodes to identify files and file attributes (such as creation time, access permissions, size and block location). The file system 202 uses files to store metadata describing the layout of its file system; these metadata files include, among others, an inode file. A file handle, i.e., an identifier that includes an inode number, is used to retrieve an inode from storage.

Broadly stated, the inodes of the write-anywhere file system are organized into the inode file. Volume information (volinfo) and file system information (fsinfo) blocks specify the layout of information in the file system, the latter block including an inode of a file that includes all other inodes of the file system (the inode file). Each logical volume (file system) has an fsinfo block that is preferably stored at a fixed location within, e.g., a RAID group. The inode of the fsinfo block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file.

Figure 3:
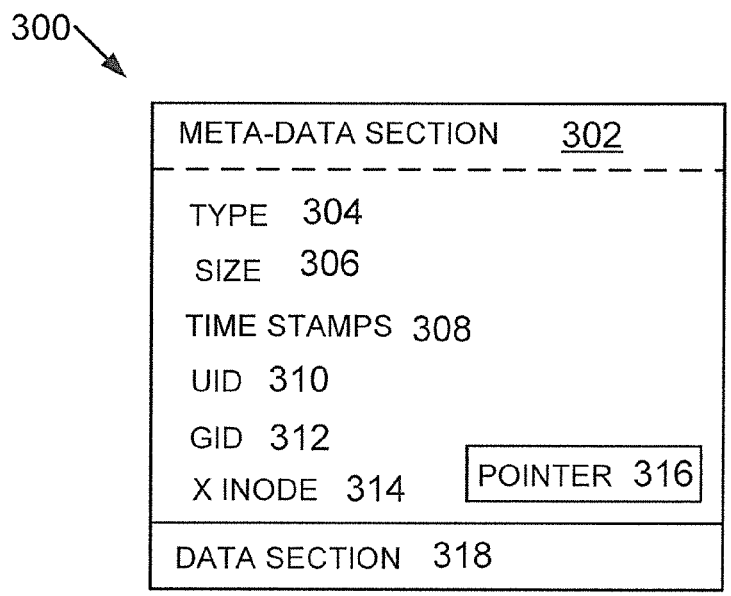
FIG. 3 shows a block diagram on an inode structure used by the storage operating system of a storage server.

Inode Structure:

FIG. 3 shows an example of an inode structure 300 (may also be referred to as inode 300) used according to one aspect of the present disclosure. Inode 300 may include a meta-data section 302 and a data section 318. The information stored in the meta-data section 302 of each inode 300 describes a file and, as such, may include the file type (e.g., regular or directory) 304, size 306 of the file, time stamps (e.g., access and/or modification) 308 for the file and ownership, i.e., user identifier (UID 310) and group ID (GID 312), of the file. The metadata section 302 may also include a X-inode field 314 with a pointer 316 that references another on-disk inode structure containing, e.g., access control list (ACL) information associated with the file or directory.

The contents of data section 318 of each inode 300 may be interpreted differently depending upon the type of file (inode) defined within the type field 304. For example, the data section 318 of a directory inode structure includes meta-data controlled by the file system, whereas the data section of a "regular inode" structure includes user-defined data. In this latter case, the data section 318 includes a representation of the data associated with the file. Data section 318 of a regular on-disk inode file may include user data or pointers, the latter referencing, for example, 4 KB data blocks for storing user data at a storage device.

Inode structure 300 may have a restricted size (for example, 122 bytes). Therefore, user data having a size that is less than or equal to 64 bytes may be represented, in its entirety, within the data section of an inode. However, if the user data is greater than 64 bytes but less than or equal to, for example, 64 kilobytes (KB), then the data section of the inode comprises up to 16 pointers, each of which references a 4 KB block of data stored at a disk. Moreover, if the size of the data is greater than 64 kilobytes but less than or equal to 64 megabytes (MB), then each pointer in the data section 318 of the inode references an indirect inode that contains 1024 pointers, each of which references a 4 KB data block on disk.

Figure 4:
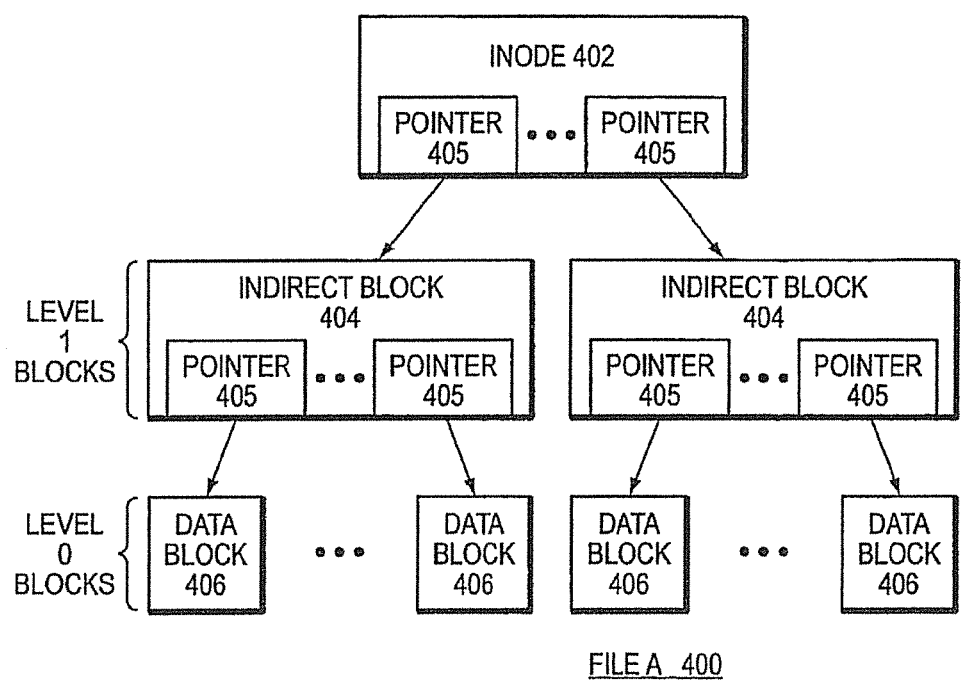
FIG. 4 shows a hierarchical inode structure used according to one aspect of the present disclosure.

Buffer Tree:

FIG. 4 is an example of an inode buffer tree of a data container that may be used by the storage system 120. The buffer tree is an internal representation of blocks for a data container (e.g., file A 400) loaded into the buffer cache 134 and maintained by the file system 202. A root (top-level) inode 402, such as an embedded inode, references indirect (e.g., Level 1.) blocks 404. The indirect blocks (and inode) contain pointers 405 that ultimately reference data blocks 406 used to store the actual data of file A. That is, the data of file A 400 are contained in data blocks and the locations of these blocks are stored in the indirect blocks of the file. Each Level 1 indirect: block 404 may contain pointers to many data blocks. According to the "write anywhere" nature of the file system, these blocks may be located anywhere at the storage devices.

In one aspect, a write allocator 718 (described below with respect to FIG. 7C) of the file system implements a write technique in response to an event in the file system (e.g., writing/updating of a file). In one aspect, the write allocator 718 allocates blocks, and frees blocks, to and from a virtual volume (may be referred to as VVOL) of an aggregate. The aggregate, as mentioned above, is a physical volume comprising one or more groups of storage devices, such as RAID groups, underlying one or more VVOLs of the storage system. The aggregate has its own physical volume block number (PVBN) space and maintains metadata, such as block allocation bitmap structures, within that PVBN space. Each VVOL also has its own virtual volume block number (VVBN) space and maintains metadata, such as block allocation bitmap structures, within that VVBN space. Typically, PVBNs are used as block pointers within buffer trees of files (such as file 400) stored in a VVOL.

In conventional systems, both the PVBN and VVBN are included in the parent indirect (e.g., Level 1) blocks in a buffer tree of a file. This indirection becomes a challenge when blocks are moved from one location to another, as described below in detail. The TVBN address space addresses these challenges, also described below in detail.

Figure 5:
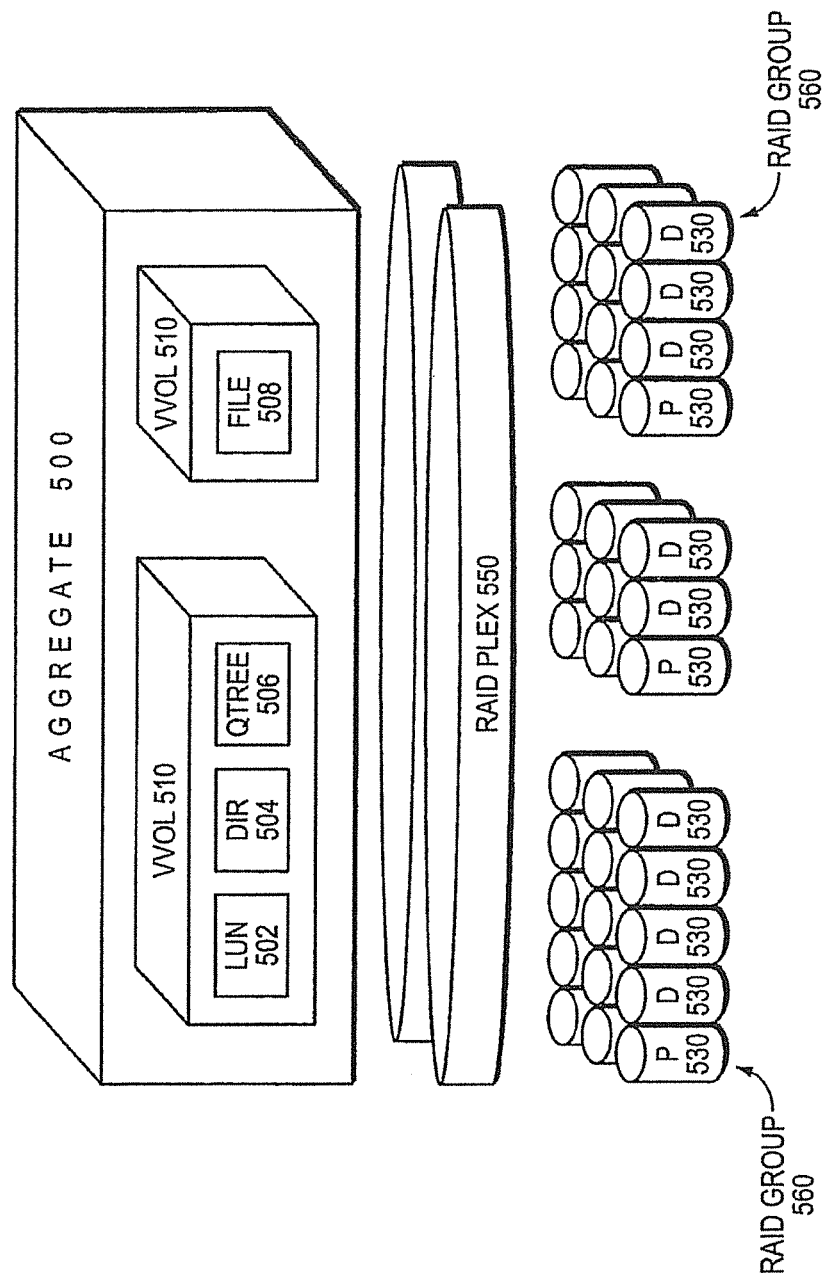
FIG. 5 shows a block diagram of an aggregate, used according to one aspect of the present disclosure.

Aggregate 500:

Before describing the attributes of the TVBN address space, the following provides a brief description of an aggregate 500 shown in FIG. 5 and may be advantageously used, according to one aspect of the present disclosure. LUNs (blocks) 502, directories 504, qtrees 506 and files 508 may be contained within VVOLs 510 that, in turn, are contained within the aggregate 500. The aggregate 500 may be illustratively layered on top of a RAID system, which is represented by at least one RAID PLEX 550 (depending upon whether the storage configuration is mirrored), wherein each RAID FLEX 550 comprises at least to one RAID group 560. Each RAID group further comprises a plurality of storage devices 530, e.g., one or more data (D) disks and at least one (P) parity disk.

Whereas the aggregate 500 is analogous to a physical volume, a VVOL is analogous to a data container within that physical volume. That is, the aggregate 500 may include one or more files, wherein each file contains a VVOL 510 and is wherein the sum of the storage space consumed by the VVOLs is physically smaller than (or equal to) the size of the overall, physical volume. The aggregate utilizes the PVBN space that defines storage space of blocks provided by the storage devices of the physical volume, while each embedded VVOL (within a file) utilizes a "logical" VVBN space to organize those blocks, e.g., as files. Each VVBN space is an independent set of numbers that corresponds to locations within the file, which locations are then translated to dbns at storage devices.

Figure 6A:
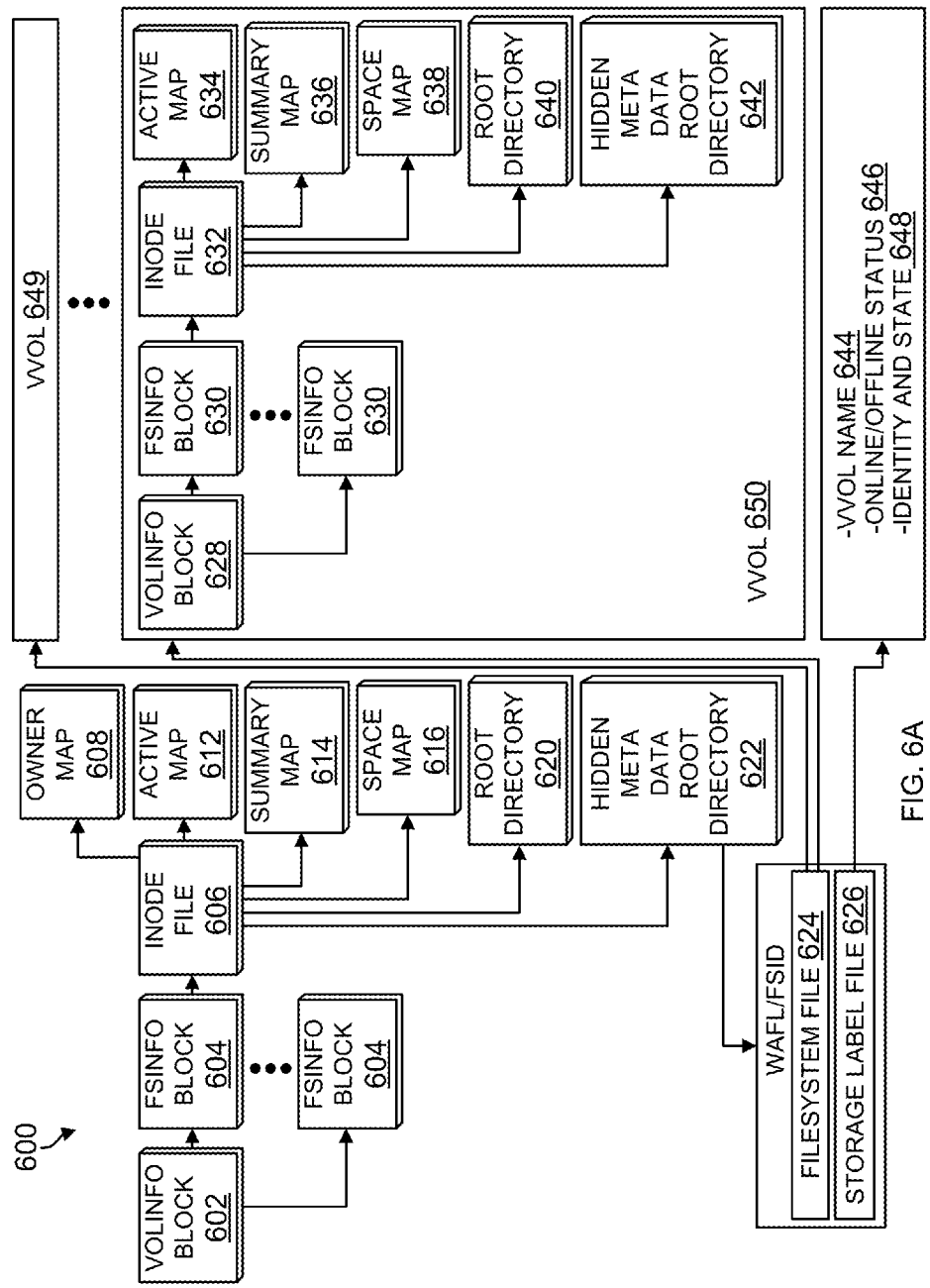
FIG. 6A shows a logical representation of an aggregate structure.

Aggregate Representation:

FIG. 6A is a schematic block diagram of an on-disk representation of an aggregate 600 having a plurality of PVBNs, according to one aspect. For example, aggregate 600 includes a "physical" volinfo block 602 for the aggregate with pointers to fsinfo blocks 604, each of which may represent a snapshot of the aggregate. Each fsinfo block 604 includes a block pointer to an inode file 606 that contains inodes of a plurality of files, including an owner map 608, an active map 612, a summary map 614 and a space map 616, as well as other special metadata files.

The inode file 606 further includes a root directory 620 and a "hidden" metadata root directory 622, the latter of which includes a namespace having files related to a VVOL in which users cannot "see" the files. The hidden metadata root directory also includes a WAFL/fsid/directory structure, as described herein, which contains a file system file 624 and storage label file 626. Note that root directory 620 in the aggregate is empty; all files related to the aggregate are organized within the hidden metadata root directory 622.

The file system file 624 includes block pointers that reference various file systems embodied as VVOLs 649. The aggregate 600 maintains these VVOLs 649 at special reserved inode numbers. Each VVOL 649 also has special reserved inode numbers within its VVOL space that are used for, among other things, block allocation bitmap structures. As noted, the block allocation bitmap structures, e.g., active map 634, summary nap 636 and space map 638, are located in each VVOL.

Specifically, each VVOL 649 has the same inode file structure/content as the aggregate, with the exception that there is no owner map and no WAFL/fsid/filesystemfile, storage label file directory structure in a hidden metadata root directory 642. To that end, each VVOL 649 has a volinfo block 628 that points to one or more fsinfo blocks 630, each of which may represent a snapshot of the VVOL. Each fsinfo block, in turn, points to an inode file 632 that, as noted, has the same inode structure/content as the aggregate with the exceptions noted above. Each VVOL 649 has its own inode file 632 and distinct inode space with corresponding inode numbers, as well as its own root directory 640 and subdirectories of files that can be exported separately from other VVOLs.

The storage label file 626 contained within the hidden metadata root directory 622 of the aggregate is a small file that functions as an analog to a conventional RAID label. A RAID label includes "physical" information about the storage system, such as the volume name; that information is loaded into the storage label file 626. Illustratively, the storage label file 626 includes the name 644 of the associated VVOL 649, the online/offline status 646 of the VVOL, and other identity and state information 648 of the associated VVOL (whether it is in the process of being created or destroyed).

Figure 6B:
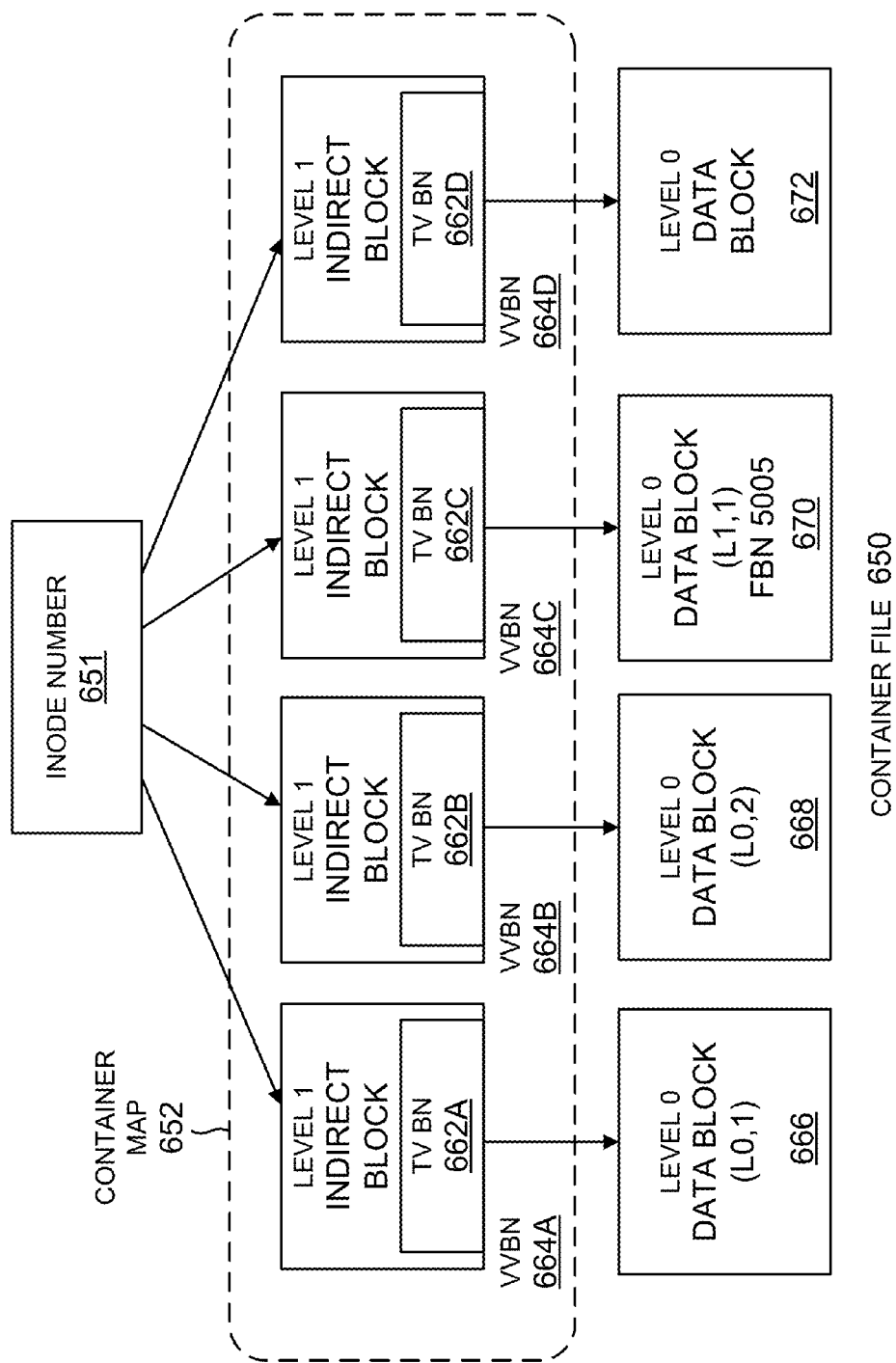
FIG. 6B shows an example of a container file, according to one aspect of the present disclosure.

FIG. 6B is a schematic block diagram illustrating a VVOL embodied as container file. The container file is a file in the aggregate having Level 0 (data) blocks (666, 668, 670 and 672) that comprise all blocks used to hold data in a VVOL; that is, the level 0 data blocks of the container file contain all blocks used by a VVOL. Level 1 (and higher) indirect blocks (654, 656, 658 and 660) of the container file reside in the aggregate and, as such, are considered aggregate blocks. Traditionally, the indirect blocks store the PVBN information that point to the level 0 blocks. In one aspect, the PVBN information is replaced by TVBN information 662A-662D as described below in detail.

The container file is an internal (to the aggregate) feature that supports a VVOL; illustratively, there is one container file per VVOL. The container file is a hidden file (not accessible to a user) in the aggregate that holds every block in use by the VVOL.

When operating in a VVOL, VVBN (664A-664D) identifies a file block number (fbn) location within the file and the file system uses the indirect blocks of the hidden container file to translate the fbn into a physical. VBN (PVBN) location within the physical volume, which block can then be retrieved from a storage device. As noted, the aggregate includes the illustrative hidden metadata root directory 622 that contains subdirectories of VVOLs including the file system file 624 and the storage label file 626 (FIG. 6A).

The storage label file 626 is illustratively a 4 kB file that contains metadata similar to that stored in a conventional RAID label. In other words, the storage label file is the analog of a RAID label and, as such, contains information about the state of the VVOL such as, e.g., the name of the VVOL, a universal unique identifier (UUID) and fsid of the VVOL, whether it is online, being created or being destroyed, etc.

The file system file 624 is a sparse file that contains all blocks owned by a VVOL and, as such, is referred to as the container file for the VVOL.

The container file 650 has an inode 651 that is assigned an inode number. The container file is essentially a virtual disk and, since it contains all blocks owned by its VVOL, a block with VVBN X in the VVOL can be found at fbn X in the container file.

Figure 7A:
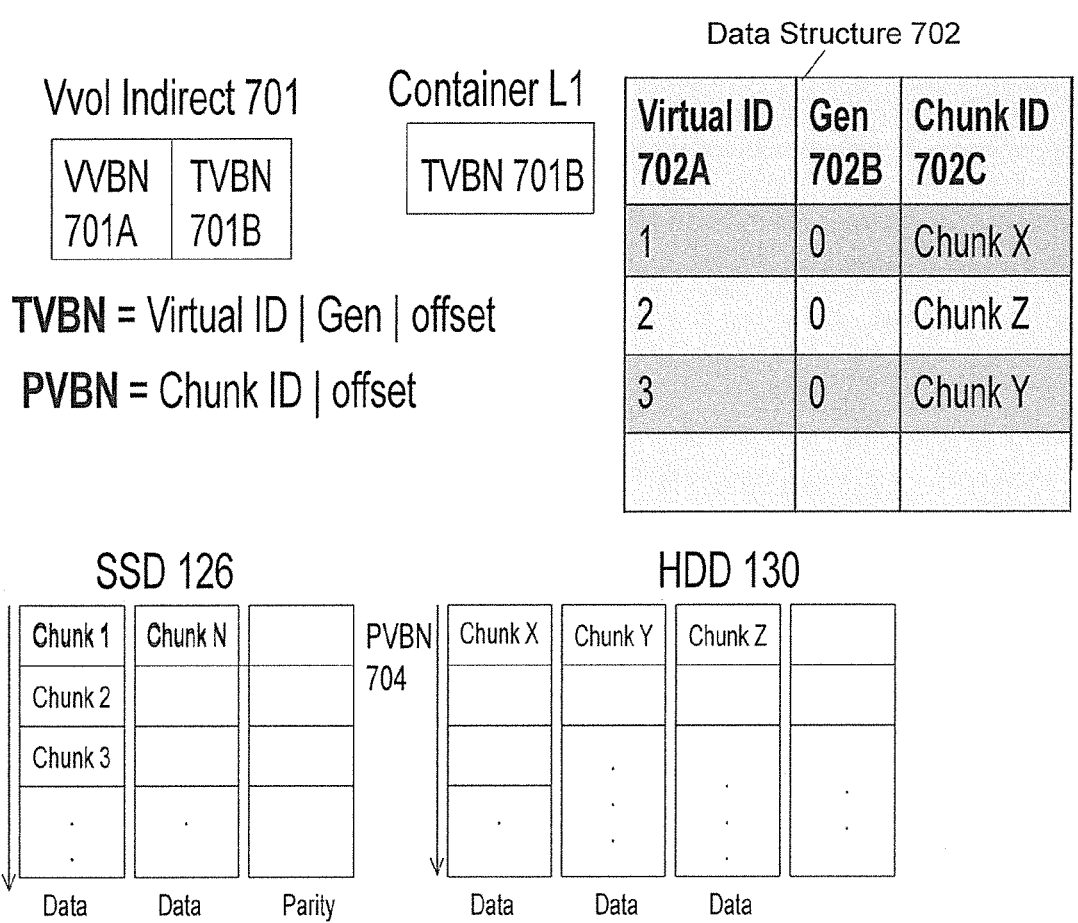
FIG. 7A shows an example of a transfer volume block number (TVBN) address space, according to one aspect of the present disclosure.

TVBN Space:

In one aspect, TVBN, a new virtual address space, is provided to abstract physical location of blocks of a storage device from a volume. The TVBN space maps "chunks" of contiguous physical blocks at a storage device to unique virtual identifiers (may also be referred to as virtual ID). The virtual IDs with an offset of the block in a given chunk is stored at an indirect L1 block, instead of the PVBN of conventional systems. The chunk to virtual ID relationship is stored at a data structure (may also be referred to as chunk data structure or chunk map) 702, as shown in FIG. 7A. Data structure 702 may be stored at memory 112. The use of TVBN as described below in detail enables data movement between different storage tiers without having to invalidate indirect block pointers at the Level 1 blocks.

As mentioned above, data structure 702 is based on dividing the PVBN space of a storage device 126 and/130 into a plurality of "chunks" 700. As shown in FIG. 7A, the PVBN 700 for SSD 126 may be divided into chunks Chunk 1, 2, 3 and so forth. The PVBN 704 of hard drive (HDD) 130 may be divided in Chunks X, Y, X and so forth. In one aspect, a chunk is a set of contiguous PVBNs at the storage device. Chunks may be aligned from a start PVBN of each storage device of an aggregate.

Each chunk is uniquely identified by the chunk identifier (shown as Chunk ID in Column 702C). The chunk ID may be derived from a first PVBN in the chunk. When storage device PVBNs chunk size is aligned with chunk ID, then the chunk ID can be derived from the most significant bit of the PVBN.

Column 702A stores the virtual ID of a chunk and column 702B stores a generation count (shown as Gen). Chunk ID to virtual ID relationship is created when data is write allocated to a chunk. For example, when data is first write allocated to say, chunk 1, a virtual ID is assigned to chunk 1. This relationship is updated when data is moved. For example, if data is moved to chunk 2, then the virtual ID is assigned to chunk 2.

The generation count enables the file system to track data that may have moved without incurring a redirection penalty. In one aspect, the generation count is zero when a virtual ID is first used. The count is incremented when the data is moved.

As described above with respect to FIG. 6A, the file system 202 places PVBN at a Level 1 block. When data is moved, the indirect block becomes stale. For a read operation with stale PVBN, the file system 202 has to load the L1 block, consult it and issue another read to the storage device with an updated PVBN. The read redirection penalty may be quite high, especially when thousands of blocks may have been moved at various storage devices.

In one aspect, the VVOL indirect 701 stores the VVBN 701A and a TVBN 701B instead of storing the PVBN with the VVBN. The TVBN 701B is stored at a L1 block, shown as Container L1 in FIG. 7A. The use of the TVBN space reduces the redirection cost and the metadata cost of tiering data as described below in more detail. In one aspect, to reduce the cost of redirection, data structure 702 is stored at memory 112.

As an example, a TVBN may be 48 bits and may include a TVBN identifier (TVBN ID), the generation count (for example, a 4-bit value), a virtual ID of the chunk (24-bit value) and an offset (for example, a 19-bit value) of the PVBN of the chunk. The PVBN is obtained from the chunk ID and the offset value, as described below in detail.

In one aspect, the virtual ID and the generation count is stored in a checksum context of each block so that the chunk ID data structure (may also be referred to as chunk ID map metafile) 702 can be recreated in case there is any corruption.

As an example the virtual ID may be a monotonically increasing hex value, such that there is a one-on-one relationship between the virtual ID and the chunk ID. The virtual IDs may be chronologically assigned in the same order as the chunk ID. This relationship may be created for all chunks within an aggregate. The virtual ID is updated when data is moved from one chunk to another chunk either within the same storage device or another storage device. As described below, virtual ID to chunk ID mapping is used for read operations to convert a TVBN to a PVBN and chunk ID to virtual ID mapping is used write allocation. The PVBN may be derived from the chunk ID and the offset values.

Figure 7B:
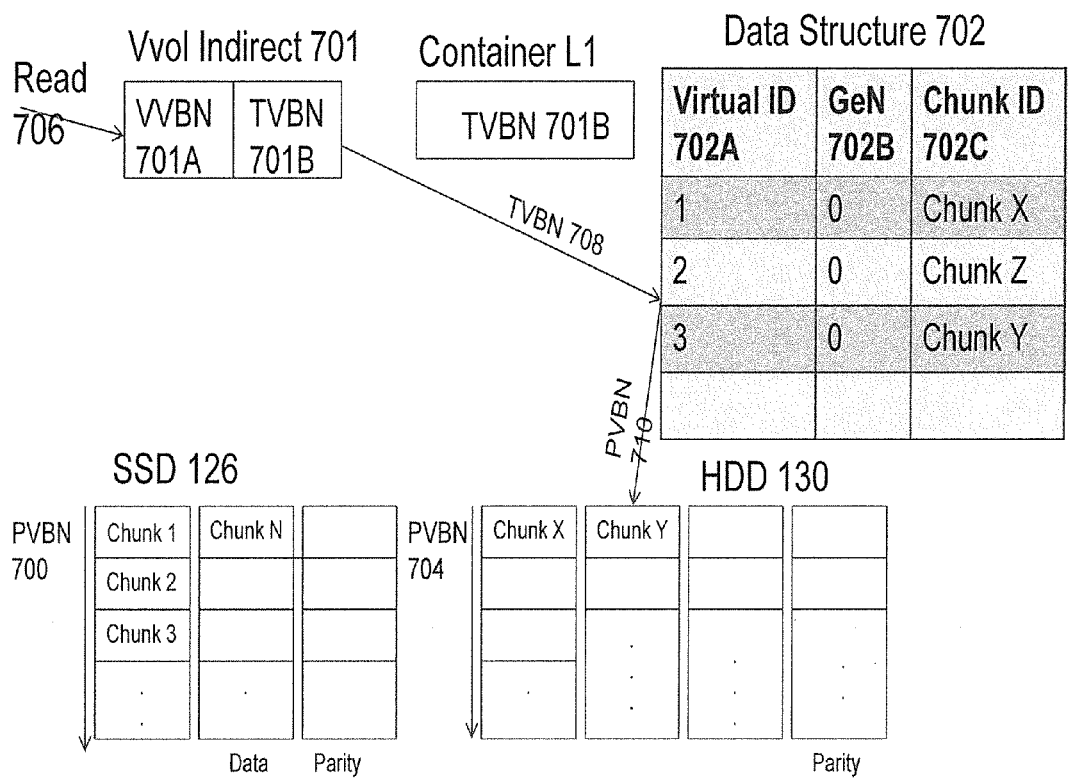
FIG. 7B shows an example of using the TVBN address space for a read request, according to one aspect of the present disclosure.

FIG. 7B shows an example of converting TVBN to PVBN for a read operation, according to one aspect. A read request 706 provides the VVBN and TVBN. The TVBN 708 is used to index into the data structure 702. The data structure 702 provides the PVBN value (710) i.e. the chunk ID and the offset that points to the chunk and the location within the chunk where the data is stored.

Figure 7C:
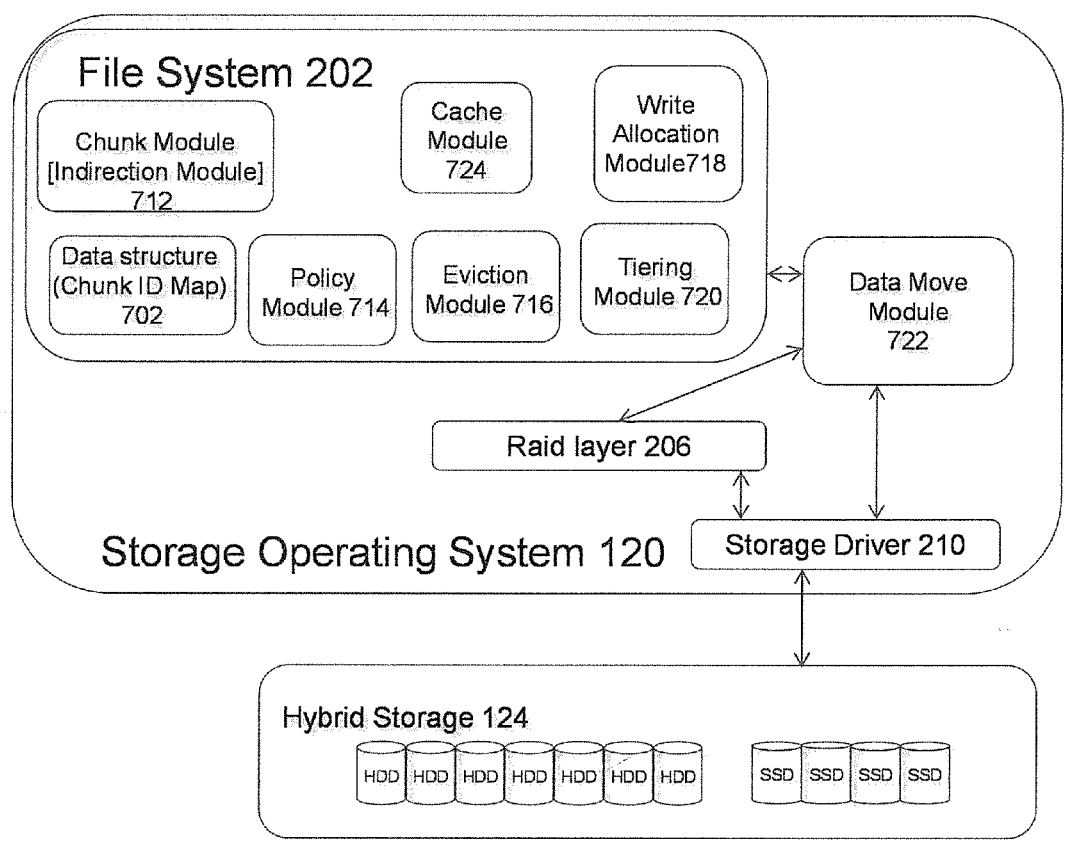
FIG. 7C shows a block diagram with various components of a file system of the storage operating system used according to one aspect of the present disclosure.

FIG. 7C shows a detailed block diagram of file system 202 that uses data structure 702, according to one aspect of the present disclosure. The file system 202 includes or interfaces with a chunk module 712, a policy module 714, an eviction module 716, a write allocation module (or write allocator) 718, a tiering module 720 and a cache module 724.

The cache module 724 manages writing data to the buffer cache 134. The chunk manager 712 creates and updates the chunk ID map 702 and manages the chunk to virtual ID mapping and the generation count. In one aspect, the chunk manager 712 provides application programming interfaces (APIs) to obtain the virtual ID, compute a TVBN and update mapping information. The write allocator 718 uses the APIs to compute the TVBN for a given VVBN. The write allocator 718 also allocates a VVOL block for a write operation to a PVBN. The write allocator 718 uses data structure 702 to compute the TVBN by using the virtual ID and then stores the TVBN at an indirect L1 container file (for example, 650, FIG. 6B).

The tiering engine 720 selects the best chunks to move from one storage tier to another based on smart heuristics described below in detail. In one aspect, the age of a chunk, "hotness of a chunk" and "fullness of a chunk" may be used as factors for moving chunks of data. The age of a chunk provides the last time a chunk was written. Recently written chunks are left alone while older chunks may be moved. Counters and time stamps are used to track the chunk age.

The hotness of chunk is determined by a number of blocks that are being accessed in a given chunk. A higher temperature denotes more blocks being accessed compared to a lower temperature chunk.

The fullness of a chunk is defined by a threshold value that defines a number of blocks that are allocated within a chunk. When the number of allocated block is below a threshold, then it may not be ready for being moved. In one aspect, the policy module 714 defines age, hotness ad fullness of a chunk. This information may be stored at a policy data structure (not shown).

In one aspect, the eviction engine 716 determines a score for the chunks by tracking the foregoing factors using one or more counters so that data can be tiered. Chunks that are written long time ago, are nearly full and have fewer read hits will have a low score and are identified as being ready to be moved from a performance tier (126) to a capacity tier (130).

A data move module 722 interfaces with RAID layer 206 and storage drivers 210 to move data from a source location to a destination location. The data move module 722 interfaces with the file system 202 using a message interface to receive a request for moving information and notifying the file system 202 after data is moved so that the chunk ID map (data structure 702) can be updated.

In one aspect, data is transferred from a source chunk to a destination chunk. After a chunk is transferred, the destination chunk is a mirror copy of the source chunk. Once the data is moved, the chunk ID map is updated, such that the source chunk's virtual ID maps to the destination chunk ID and the destination chunk's virtual ID maps to the source chunk ID. The TVBN address of a moved block does not change which means that the indirect Level 1 pointers continue to be valid. Because the allocation files are in a TVBN space and the TVBN address does not change, no updates are needed to the allocation files.

As an example, assume that a source virtual ID A is mapped to a source chunk 1 and a destination virtual ID is B for chunk 2. Before the move, virtual ID A maps to chunk 1 and virtual ID B maps to chunk 2. After the move, virtual ID A maps to chunk 2 and virtual ID B maps to chunk 1.

RAID layer 206 aligns the PVBN space of a storage device to a chunk size. As an example, a storage device, disk block number (DBN) space may be aligned with 64 k block sizes. Because the PVBN space is aligned with the chunk size, the chunk ID can be derived from the most significant bits of the PVBN.

Figure 8A:
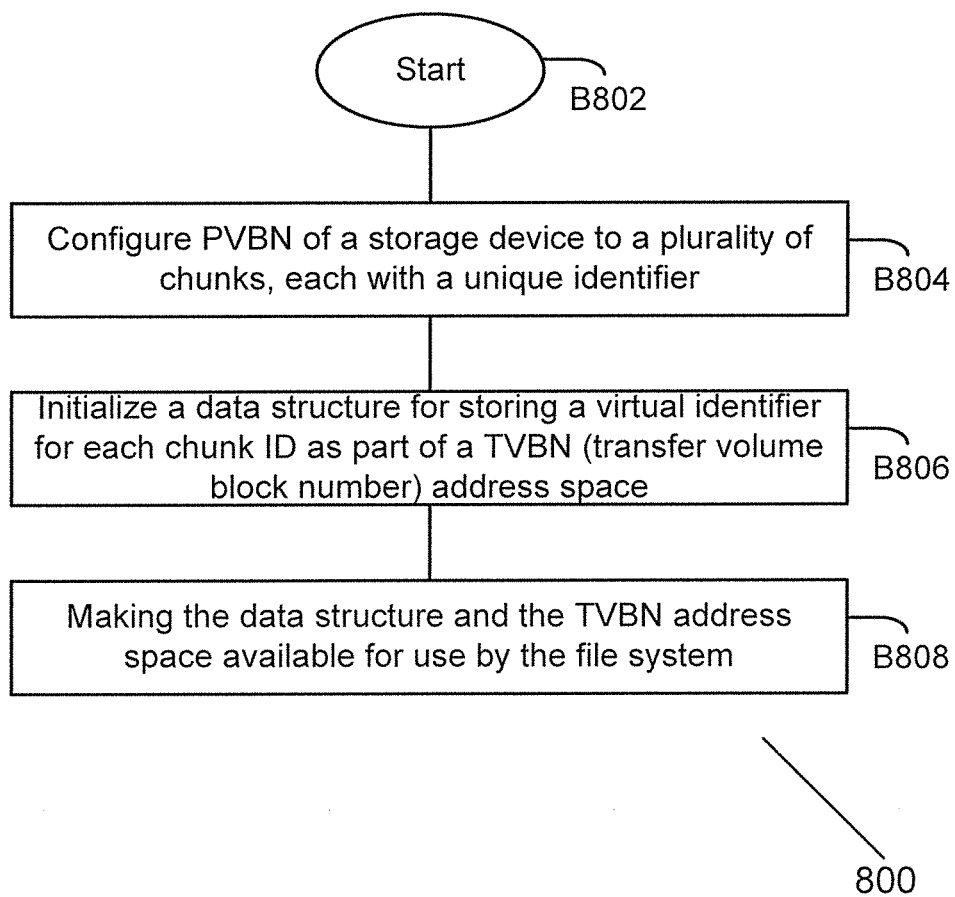
FIG. 8A shows a process for configuring the TVBN address space, according to one aspect of the present disclosure.

Process Flows:

FIG. 8A shows a process 800, according to one aspect of the present disclosure. The process begins in block B802. In block B804, the PVBN space of a storage device (for example, 700 and 704, FIG. 7A) is divided into N number of chunks. In one aspect, each chunk may have uniform size and is uniquely identified by a chunk ID. In aspect, block B804 may be performed by the file system 202 or any other component.

In block B806, data structure 702 is initialized. As described above, data structure 702 is configured to store a virtual ID, a generation count and a chunk ID.

In block B808, the data structure is made available for use by the file system 202 in general and the write allocator 718 in particular, for writing data, tiering data (i.e. moving data from one storage tier to another tier) and reading data, as described below in detail.

Figure 8B:
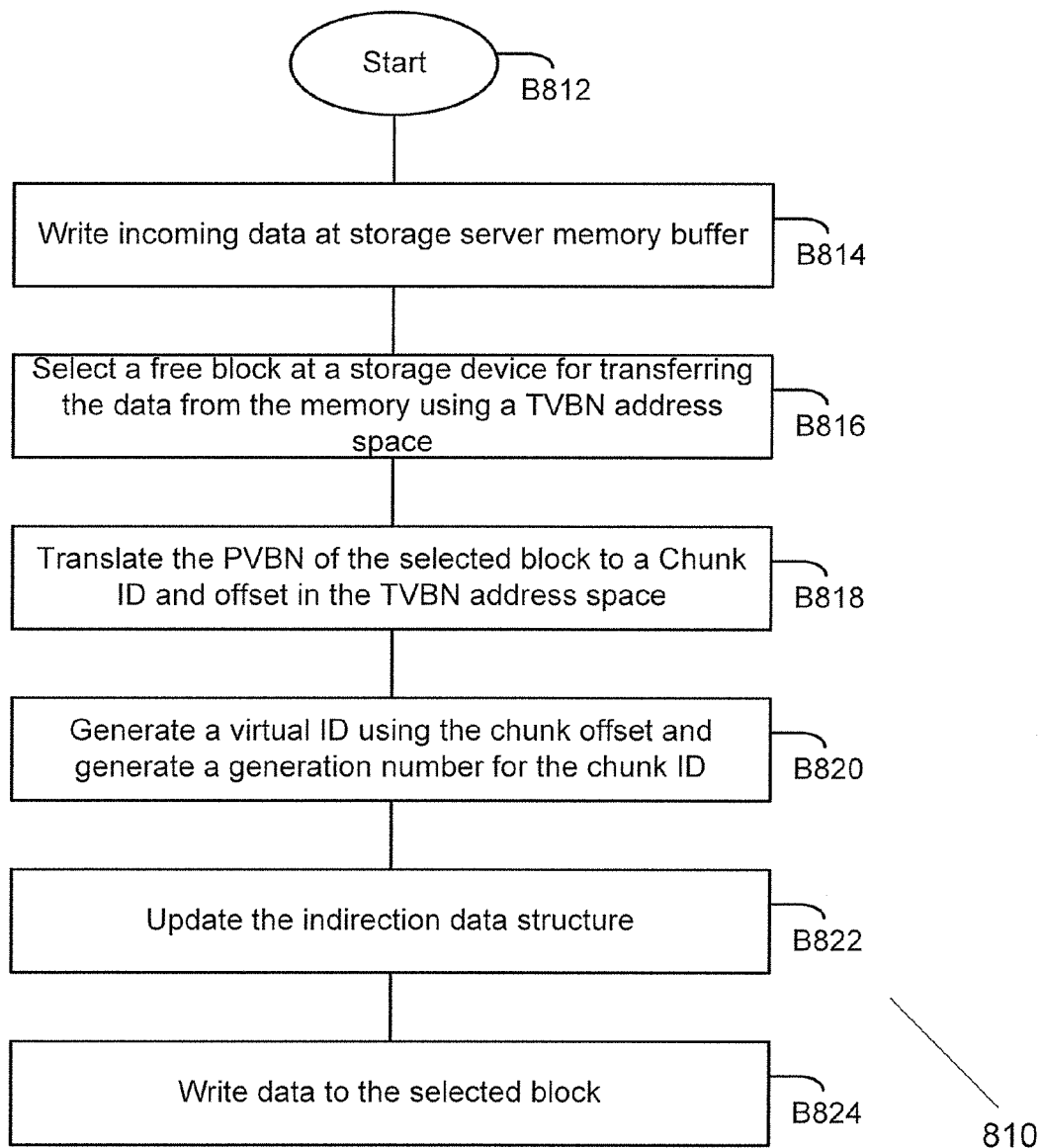
FIG. 8B shows a write process flow using the TVBN address space, according to one aspect of the present disclosure.

FIG. 8B shows a process 810 for writing data using the TVBN space, according to one aspect of the present disclosure. The process blocks are executed by processor executable file system 202 of the storage operating system and other components. The process begins in block B812, when the storage server 120 receives a write request to store data. In block B814, the data is first written at the buffer cache 134. Once the data is written at the buffer cache 134, a completion is sent to the client. As described below, data is later flushed from the buffer cache 134 to persistent storage as part of a consistency point (CP) operation.

In block B816, a free block at a storage device is selected by the write allocator 708. As described above, each block of the storage device is part of the PVBN space (for example, 702, 704 of FIG. 7A) that is divided into a plurality of chunks. In block B818, the PVBN of the selected block is translated to a chunk ID and an offset value within the chunk.

In block B820, the file system 202 generates a virtual ID and a generation count. Data structure 702 is updated with the generated virtual ID and the generation count. If the block is written for the first time the generation count is zero, otherwise it has a value greater than zero.

In block B822, the VVOL 701A and the container, Level 1 data structure 701B is updated by the TVBN, instead of the PVBN that is used in conventional systems. Thereafter, data is written to the storage device in block B824.

Figure 8C:
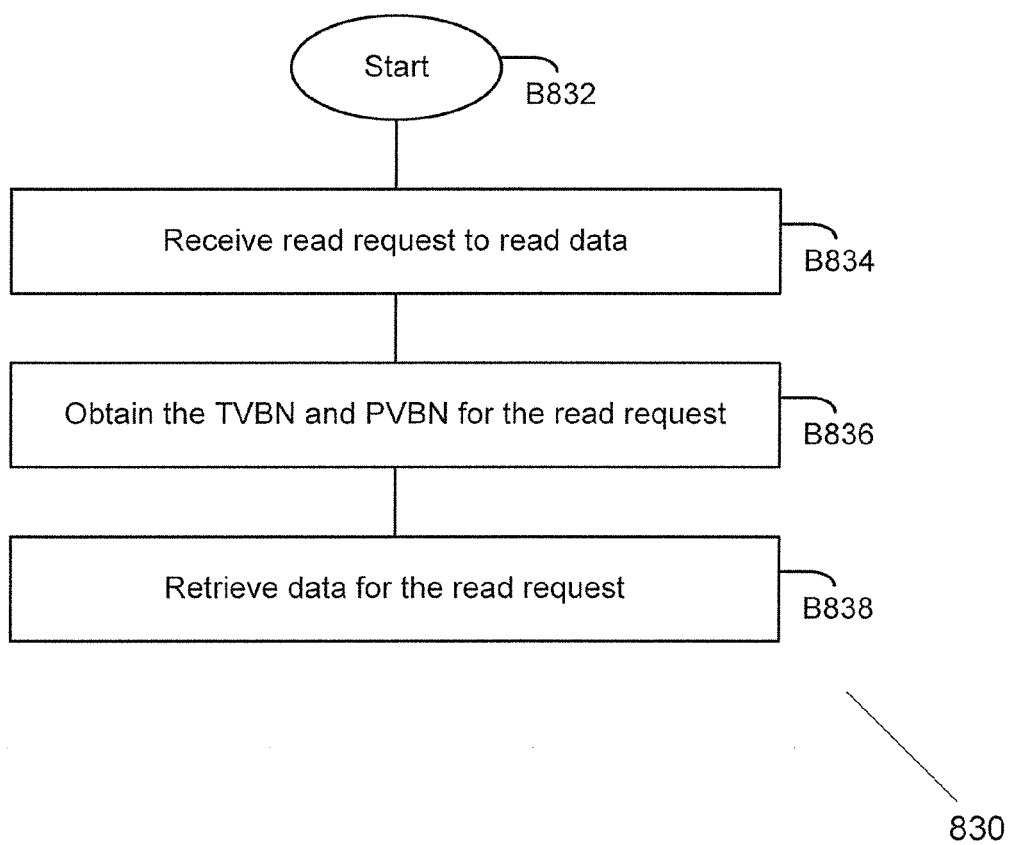
FIG. 8C shows a read process flow using the TVBN address space, according to one aspect of the present disclosure.

FIG. 8C shows an example of a read process flow 830, using the TVBN space, according to one aspect of the present disclosure. An example of the read process is also shown in FIG. 7B that has been described above in detail. The process begins in block B832 after the storage server 120 is operational and some data has been stored using the file system 202.

In block B834, a read request is received by the file system. In block B836, the TVBN is obtained from the VVOL indirect 701A. If the TVBN's generation count does not match, then the container L1 701B is loaded to obtain the most current TVBN. The TVBN is used to index into data structure 702. The chunk ID and the offset are obtained to compute the PVBN. Using the PVBN, the stored data is retrieved in block B838. If the PVBN is for a SSD, then data is read from the SSD 126. If the PVBN is not for the SSD, first a caching data structure maintained by the caching engine 724 is checked to see if the data is cached at memory 112, if yes, then the data is retrieved from memory 112. If there is a cache miss, then data is retrieved from HDD 130.

Figure 9:
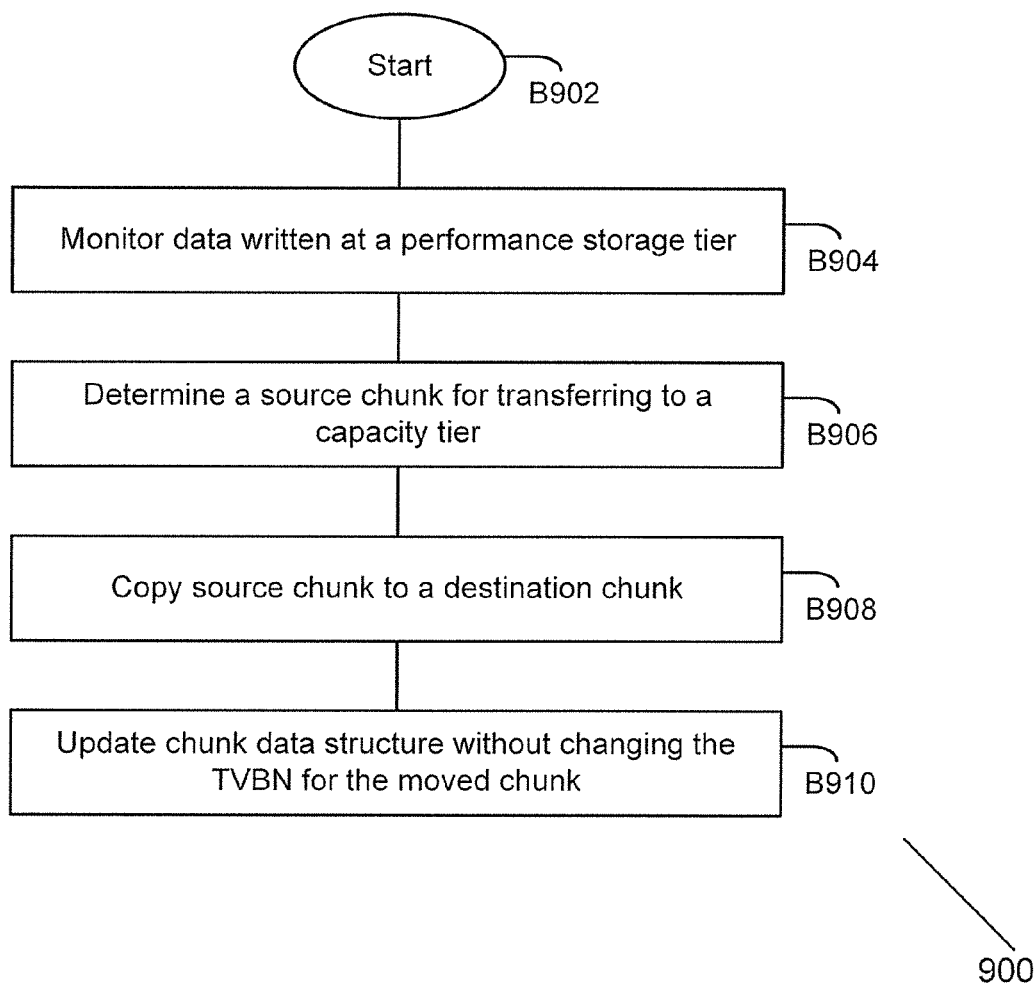
FIG. 9 shows a process for transferring data from one storage tier to another storage tier, according to one aspect of the present disclosure.

FIG. 9 shows a process 900 for moving data from one storage tier to another storage tier, according to one aspect of the present disclosure. The process begins in block B902, when data has been written by the file system at one or more location of SSD 126. The written data is monitored based on a set policy maintained by the policy module 714. The written data is monitored by eviction module 716. In one aspect, the eviction module 716 tracks the last time the data was accessed, i.e. the temperature of the data, when data was written, i.e. the age of the data and the fullness of a chunk. As mentioned above, various counters may be used to track these factors. Based on these factors, a source chunk is selected in block B908.

In block B910, the selected source chunk is moved to a destination, for example, to a capacity tier storage device 130. Before the data is moved, the file system 202 ensures that there are enough blocks at the destination to store the transferred chunk. After the entire chunk is transferred, in block B912, the source chunk's virtual ID is mapped to the destination chunk at data structure 702. The TVBN address of the block does not change after the move which ensures that the indirect block pointers remain valid. Since the TVBN address does not change, no updates are needed to the allocation files. Thereafter, the process ends.

In one aspect, the TVBN space improves performance, especially for tiering data. The redirection penalty is reduced because the chunk data structure is stored at the memory of the storage server.

Cloud Computing:

The system and techniques described above are applicable and especially useful in the cloud computing environment where storage is presented and shared across different platforms. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to a network, for example, the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer, is a cloud platform and cloud infrastructure, followed by a "server" layer that includes hardware and computer software designed for cloud specific services. The storage systems described above can be a part of the server layer for providing storage services. Details regarding these layers are not germane to the inventive aspects.

Thus, methods and apparatus for storage systems has been described. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:

storing data at a first storage tier by a processor executable storage operating system;

tracking the data stored at the first storage tier for determining when to move the data to a second storage tier based on a score for rating storage space at the first storage tier determined by a plurality of parameters defined by a policy for the data;

transferring the data from the first storage tier to the second storage tier based on the score; and updating a data structure for mapping a virtual identifier of a source storage chunk identified by a source chunk identifier at the first storage tier to a destination chunk identifier of a destination storage chunk at the second storage tier;

wherein the source chunk identifier is based on a physical volume block number (PVBN) of a PVBN address space having a plurality of storage chunks with a plurality of contiguous blocks for storing information and the PVBN for the source storage chunk is defined by the source chunk identifier and an offset value for the source storage chunk within the PVBN address space;

wherein the virtual identifier and a generation count for the source storage chunk is initially assigned when the data is first written to the source storage chunk and initially maps to the source chunk identifier;

wherein the virtual identifier, the generation count and the offset define a transfer volume block number (TVBN) of a TVBN address space, where the TVBN is used to obtain a PVBN for the destination storage chunk to read the data from the destination storage chunk; and wherein instead of PVBN information for the data, TVBN for the data is stored at an indirect block of a tree structure maintained by the storage operating system.

2. The machine implemented method of claim 1, wherein the data structure is stored at a memory of a storage server executing the storage operating system.

3. The machine implemented method of claim 1, wherein the first storage tier includes a solid state storage drive.

4. The machine implemented method of claim 1, wherein the second storage tier is a hard drive.

5. The machine implemented method of claim 1, wherein the data is ready to be moved based when the data is written.

6. The machine implemented method of claim 1, wherein the data is ready to be moved based on how often the data is accessed.

7. The machine implemented method of claim 1, wherein the data is ready to be moved based on how full the storage chunk is at any given time.

8. A non-transitory, machine readable storage medium having stored thereon instructions for performing a method, comprising machine executable code which when executed by at least one machine, causes the machine to:

store data at a first storage tier;

track the data stored at the first storage tier for determining when to move the data to a second storage tier based on a score for rating storage space at the first storage tier determined by a plurality of parameters defined by a policy for the data;

transfer the data from the first storage tier to the second storage tier based on the score; and update a data structure for mapping a virtual identifier of a source storage chunk identified by a source chunk identifier at the first storage tier to a destination chunk identifier of a destination storage chunk at the second storage tier;

wherein the source chunk identifier is based on a physical volume block number (PVBN) of a PVBN address space having a plurality of storage chunks with a plurality of contiguous blocks for storing information and the PVBN for the source storage chunk is defined by the source chunk identifier and an offset value for the source storage chunk within the PVBN address space;

wherein the virtual identifier and a generation count for the source storage chunk is initially assigned when the data is first written to the source storage chunk and initially maps to the source chunk identifier;

wherein the virtual identifier, the generation count and the offset define a transfer volume block number (TVBN) of a TVBN address space, where the TVBN is used to obtain a PVBN for the destination storage chunk to read the data from the destination storage chunk; and wherein instead of PVBN information for the data, TVBN for the data is stored at an indirect block of a tree structure maintained by a storage operating system.

9. The storage medium of claim 8, wherein the data structure is stored at a memory of a storage server executing the storage operating system.

10. The storage medium of claim 8, wherein the first storage tier includes a solid state storage drive.

11. The storage medium of claim 8, wherein the second storage tier is a hard drive.

12. The storage medium of claim 8, wherein the data is ready to be moved based when the data is written.

13. The storage medium of claim 8, wherein the data is ready to be moved based on how often the data is accessed.

14. The storage medium of claim 8, wherein the data is ready to be moved based on how full the storage chunk is at any given time.

15. A system comprising:

a memory containing machine readable medium comprising machine executable code having stored thereon instructions; and a processor module coupled to the memory, the processor module configured to execute the machine executable code to:

store data at a first storage tier;

track the data stored at the first storage tier for determining when to move the data to a second storage tier based on a score for rating storage space at the first storage tier determined by a plurality of parameters defined by a policy for the data;

transfer the data from the first storage tier to the second storage tier based on the score; and update a data structure for mapping a virtual identifier of a source storage chunk identified by a source chunk identifier at the first storage tier to a destination chunk identifier of a destination storage chunk at the second storage tier;

wherein the source chunk identifier is based on a physical volume block number (PVBN) of a PVBN address space having a plurality of storage chunks with a plurality of contiguous blocks for storing information and the PVBN for the source storage chunk is defined by the source chunk identifier and an offset value for the source storage chunk within the PVBN address space;

wherein the virtual identifier and a generation count for the source storage chunk is initially assigned when the data is first written to the source storage chunk and initially maps to the source chunk identifier;

wherein the virtual identifier, the generation count and the offset define a transfer volume block number (TVBN) of a TVBN address space, where the TVBN is used to obtain a PVBN for the destination storage chunk to read the data from the destination storage chunk; and wherein instead of PVBN information for the data, TVBN for the data is stored at an indirect block of a tree structure maintained by the storage operating system.

16. The system of claim 15, wherein the data structure is stored at a memory of a storage server executing the storage operating system.

17. The system of claim 15, wherein the first storage tier includes a solid state storage drive and the second storage tier is a hard drive.

18. The system of claim 15, wherein the data is ready to be moved based when the data is written.

19. The system of claim 15, wherein the data is ready to be moved based on how often the data is accessed.

20. The system of claim 15, wherein the data is ready to be moved based on how full the storage chunk is at any given time.

* * * * *